No. 705,790. Patented July 29, 1902.
J. C. ROBBINS.
TWO-SPEED AND DIFFERENTIAL GEAR FOR MOTOR VEHICLES.
(Application filed Oct. 31, 1900.)
(No Model.) 2 Sheets—Sheet 1.
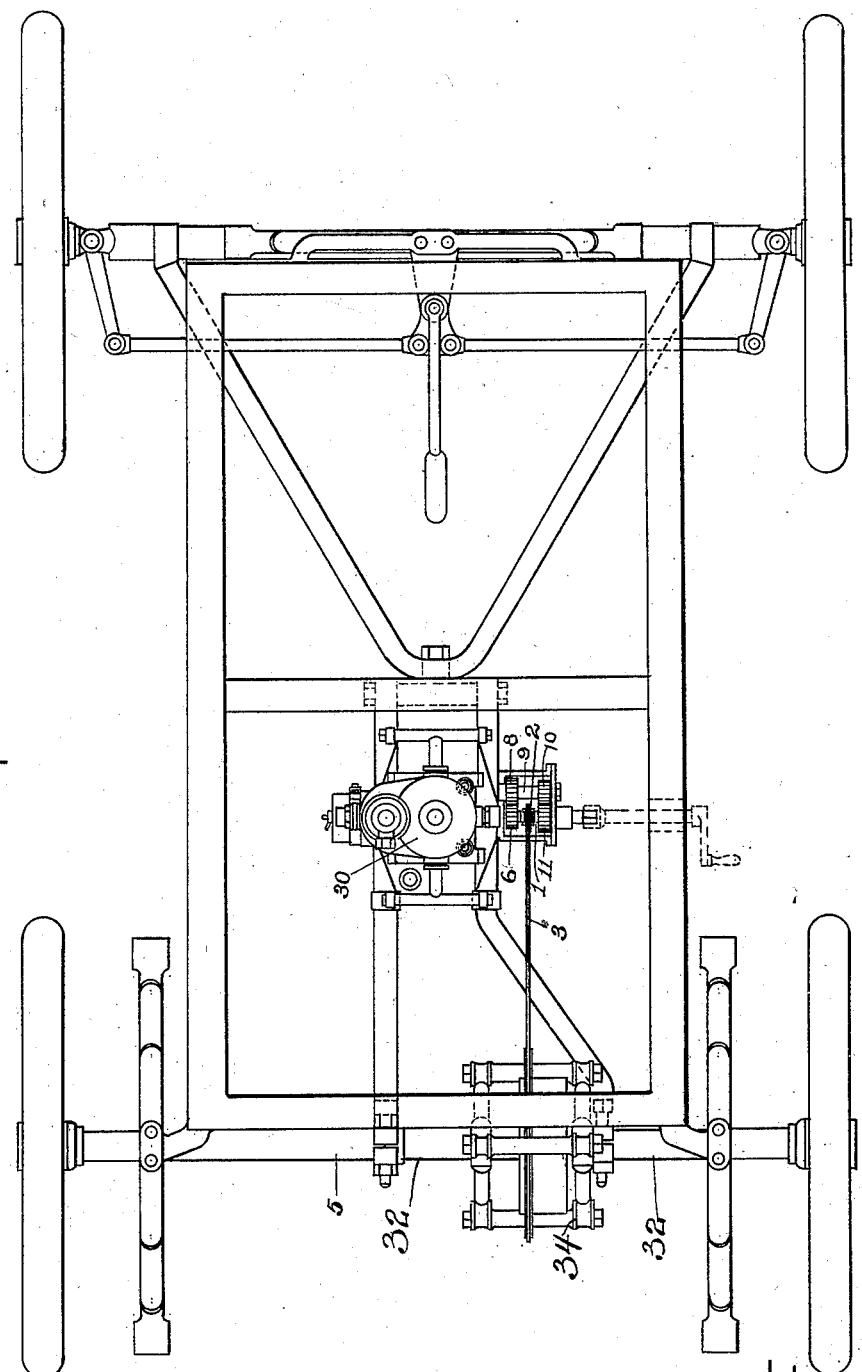

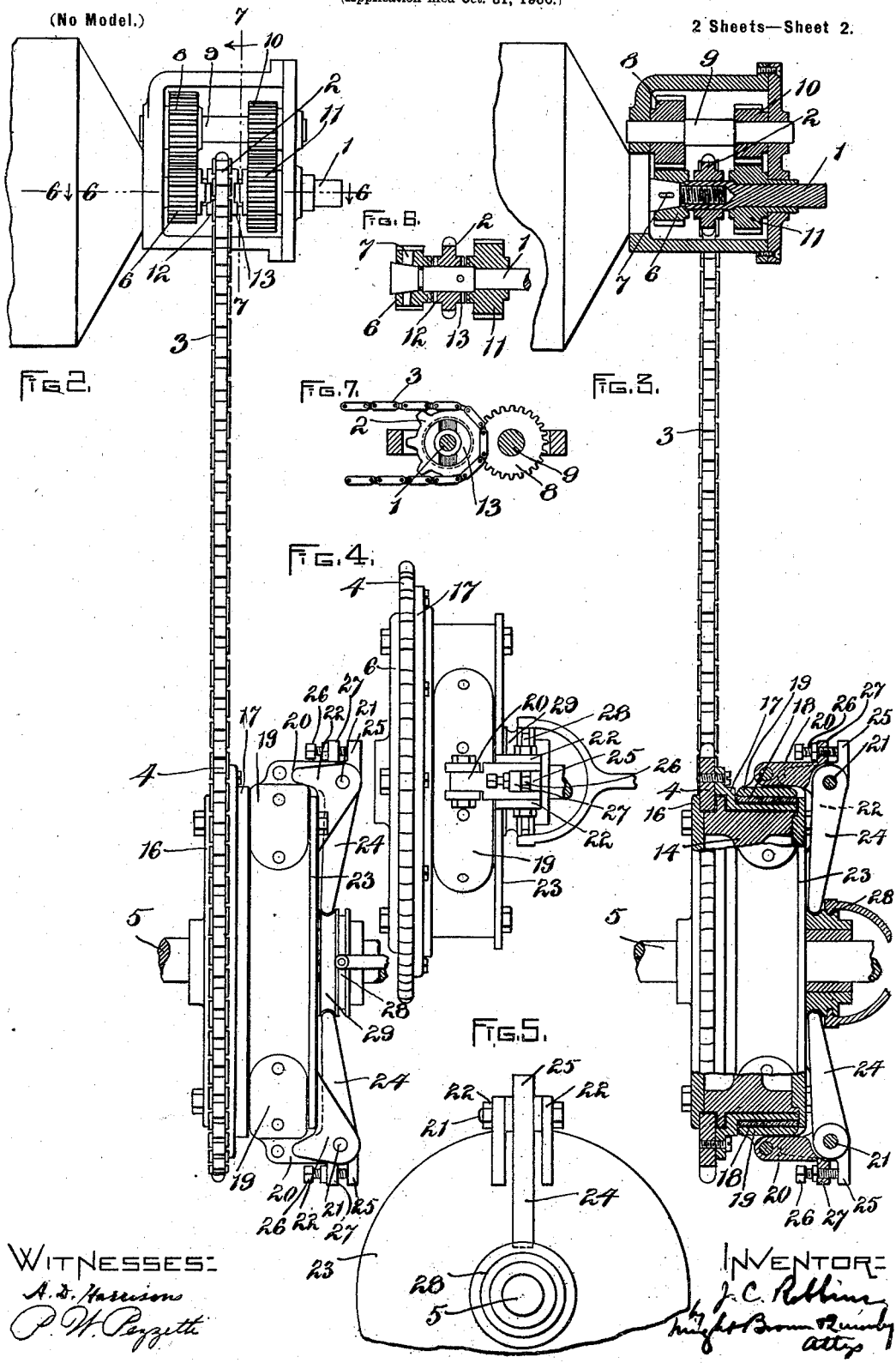

UNITED STATES PATENT OFFICE.

JOHN C. ROBBINS, OF WALTHAM, MASSACHUSETTS.

TWO-SPEED AND DIFFERENTIAL GEAR FOR MOTOR-VEHICLES.

SPECIFICATION forming part of Letters Patent No. 705,790, dated July 29, 1902.

Application filed October 31, 1900. Serial No. 35,031. (No model.)

*To all whom it may concern:*

Be it known that I, JOHN C. ROBBINS, of Waltham, in the county of Middlesex and State of Massachusetts, have invented certain new and useful Improvements in Two-Speed and Differential Gears, of which the following is a specification.

This invention relates to automobile carriages, and has for its object to provide mechanism whereby the speed of the carriage may be altered and the power obtainable for driving it varied without changing the speed or the power of the driving-motor, and also to provide means for yieldingly connecting the motor with the driving-axle, so that the carriage may be started without shock.

The invention consists in a device such as illustrated and described by which a sprocket on the driving-shaft of the motor may be caused to run at a fast or a slow speed and a friction-clutch by which the sprocket on the driving-axle of the carriage may be made fast to the axle.

In the drawings, Figure 1 represents a plan view of a motor-carriage equipped with a form of the device embodying my invention. Fig. 2 represents a plan view, on a large scale, of the device embodying my invention. Fig. 3 represents a view similar to Fig. 2, showing the device in longitudinal horizontal section. Fig. 4 represents a front elevation of the mechanism by which the friction-clutch is operated. Fig. 5 represents a side elevation of the same. Fig. 6 represents a section on line 6 6 of Fig. 2. Fig. 7 represents a section on line 7 7 of Fig. 2.

The same reference characters designate the same parts in all the figures.

Referring to the drawings, which, as stated, embody one form which my invention may have, the main shaft 1, operated by the motor 30, carries a loose sprocket 2, from which, by a chain 3 and sprocket 4, power is communicated to the driving-axle 5 of the carriage. On a tapered shoulder on the shaft 1 is secured a pinion 6 by a key 7, driven through a slot in the pinion and shaft. The pinion 6 meshes with a gear 8, fast on an auxiliary shaft 9, which also carries a gear 10, in mesh with a gear 11 on the drive-shaft 1. The gear-train is so designed that the speed of the gear 11 is less and the power delivered by it greater than that of the pinion 6, the principle being the same as that of the back gears on an engine-lathe.

The sprocket 2 is placed on the drive-shaft between the gears 6 and 11 and may be moved laterally on the shaft in such manner as to cause a clutch member 12 on the sprocket to engage an oppositely-formed clutch member on the pinion 6 when the sprocket is driven by that pinion, or it may be moved so as to bring a clutch member 13 on the opposite side of the sprocket into engagement with a clutch member on the gear 11 when the sprocket is driven from the pinion 6 through the reducing-gears 8 and 10 and the gear 11. Thus the speed of the carriage may be changed and the power developed by the driving-wheels increased or diminished by throwing the sprocket out of engagement with one clutch and into contact with another without altering the speed of the motor.

In order that no shock may occur from the sudden starting of the carriage when the sprocket 2 is thrown into engagement with either of the driving-gears, which are constantly rotating at uniform speed, the sprocket 4, by which motion is given to the driving-axle of the carriage, is held loosely on the axle and drives the axle only through a friction-clutch. The sprocket 4 when the friction-clutch is not in operation turns loosely on the periphery of a pulley or drum 14, keyed to the axle, being restrained from lateral motion by a flange 15, formed on the drum, and a disk 16, secured to the end of the drum after the sprocket is put in place. A section 17 of an annular cylinder is placed about the drum and secured to the sprocket, so as to turn with it about the drum. A split spring-ring 18 is placed about the annular cylinder 17, so as to rest loosely on the same when unconfined and to bind it when compressed. To the ring 18 are fastened pieces 19 19, placed diametrically opposite each other to distribute the pressure applied by bell-crank levers 20 20, attached to the pieces 19 and turning about pivots 21, held in ears 22, formed on a disk 23, which is secured to the drum 14.

Each lever 20 is actuated by a lever 24, which also turns about the pivot 21 when its long arm is moved by the lateral motion on the axle 5 of a cylindrical piece 28 into a groove 29, of which the long arm of the lever 24 projects. The short arm 25 of the lever 24 acts on the short arm 27 of the bell-crank lever 20 through an adjusting-screw 26. The levers 24 and 20 act together as a single bell-crank lever when the piece 28 is drawn away from the drum 14 by the operator of the vehicle to compress the spring-ring 18, forcing its ends together and causing it to bind on the annular cylinder 17. The friction between the cylinder and ring causes the ring to turn with the sprocket 4 and communicate motion to the axle of the vehicle through the pressure-distributing pieces 19, levers 20, ears 22, disk 23, and drum 14, all of which are rigidly connected together. As the friction-ring 18 will not seize the annular cylinder 17 the instant the friction is applied, but will start turning slowly and increase in speed as the inertia of the parts is gradually overcome until finally the sprocket and axle are revolving at the same speed, it is evident this device provides a convenient and efficient means of bringing a motor-vehicle from a state of rest to one of rapid motion without shock.

Although the mechanism described is the best embodiment of my invention known to me, I do not confine myself to the form of device here shown, as variations in every part of the device may be made without affecting the principle of my invention.

What I claim, and desire to secure by Letters Patent, is—

1. In a motor-vehicle, means for varying the speed of the vehicle from fast with relatively low power, to slow with increased power, without varying the speed of the motor or power developed by the same, comprising a motor-driven shaft, a gear fast thereto, a gear loose on the same shaft and driven at a different speed by the first said gear through a speed-changing train of gears, a sprocket placed between said gears also loose on said drive-shaft, a clutch member formed on each side of said sprocket, corresponding clutch members on the driving-gears adapted to engage positively with the clutch members on the sprocket, and means for moving said sprocket laterally on the shaft to cause one of its clutch members to engage with the corresponding clutch member of either driving-gear, substantially as described.

2. In a motor-vehicle provided with a driving-sprocket positively connected with the motor and a following sprocket connected by chain-gearing with the driving-sprocket and loose on the driving-axle of the vehicle, means for varying the speed of the vehicle without altering the speed of the motor, comprising a high-speed gear fast to the driving-shaft of the motor, a gear loose on said shaft and driven at a low speed through a reducing train of gears by said high-speed gear, the said driving-sprocket placed between said gears loose on said shaft, a clutch member formed on each side of said sprocket, corresponding clutch members on the driving-gears adapted to engage positively with the clutch members on the sprocket, and means for moving said driving-sprocket laterally on the shaft to cause one of its clutch members to engage with the corresponding clutch member of either driving-gear, in combination with means for yieldingly connecting the following sprocket with the driving-axle of the vehicle, on which it turns freely, comprising a friction-clutch one member of which is carried by the sprocket while the other is fast to the axle.

3. In a motor-vehicle, the combination of clutch members operating constantly at different speeds, a driving sprocket or gear having clutch members complemental thereto, provisions for bringing said sprocket or gear clutch members into connection with either of said constantly-operating clutch members, a driven axle having a friction clutch member, a complemental friction clutch member positively connected with the driving sprocket or gear, and means under control of the operator for bringing said friction clutch members into and out of clutching relation with each other.

4. In a motor-vehicle having a positively-driven sprocket or gear turning loosely about the driving-axle of the vehicle, means for yieldingly connecting said sprocket or gear with said axle, so that they will turn in unison, comprising a drum or pulley fast to the axle, a portion of an annular cylinder attached to the sprocket or gear and surrounding said drum or pulley, a suitable friction member or members surrounding said annular cylinder and suitably attached to said drum or pulley, adjustable bell-crank levers attached to the drum or pulley for pressing the friction member or members against the annular cylinder, and means controlled by the operator of the vehicle for so operating said levers as to press the friction member or members against the annular cylinder and cause the axle of the vehicle to turn with the sprocket or gear, substantially as specified.

In testimony whereof I have affixed my signature in presence of two witnesses.

JOHN C. ROBBINS.

Witnesses:
 FRANK P. KENNEY,
 JOHN F. CORCORAN.